United States Patent [19]

Dent

[11] Patent Number: 5,331,666
[45] Date of Patent: Jul. 19, 1994

[54] ADAPTIVE MAXIMUM LIKELIHOOD DEMODULATOR

[75] Inventor: Paul W. Dent, Stehag, Sweden

[73] Assignee: Ericsson GE Mobile Communications Inc., Paramus, N.J.

[21] Appl. No.: 894,933

[22] Filed: Jun. 8, 1992

[51] Int. Cl.$^5$ .................... H03D 1/00; H04L 27/06; G06F 11/10; H03M 13/12
[52] U.S. Cl. ........................... 375/94; 371/43
[58] Field of Search ............ 375/11, 12, 14, 15, 375/94, 99, 101; 371/43, 44, 45

[56] References Cited

U.S. PATENT DOCUMENTS

4,408,332 10/1983 Sari .
5,081,651 1/1992 Kubo ...................... 375/94
5,164,961 11/1992 Gudmundson ............ 375/99

Primary Examiner—Stephen Chin
Assistant Examiner—Duane Kobayashi
Attorney, Agent, or Firm—Burns, Doane, Swecker & Mathis

[57] ABSTRACT

An adaptive maximum likelihood demodulator for demodulating digital radio signals on a channel which contains impairments like inter-symbol interference, frequency errors or distortion, that vary with time. The demodulator does not employ channel models to generate signal predictions but rather directly updates the signal predictions for each state without going through the intermediate step of updating a channel model.

28 Claims, 5 Drawing Sheets

| SEQUENCES | STATE | PREDICTIONS | | PATH METRICS |
|---|---|---|---|---|
| 010010010 | 0 | P00 | P01 | 9.5 |
| 011010011 | 1 | P10 | P11 | 4.7 |

| OLDER SYMBOL HISTORY | STATE NO. | METRIC | EXPECTED COMPLEX VALUES | | | |
|---|---|---|---|---|---|---|
| | | | 00 | 01 | 10 | 11 |
| PAIRS OF SOFT VALUES | 00 | 28.2 | z0,0 | z0,1 | z0,2 | z0,3 |
| PAIRS OF SOFT VALUES | 01 | 35.6 | z1,0 | z1,1 | z1,2 | z1,3 |
| PAIRS OF SOFT VALUES | 10 | 10.3 | z2,0 | z2,1 | z2,2 | z2,3 |
| PAIRS OF SOFT VALUES | 11 | 39.0 | z3,0 | z3,1 | z3,2 | z3,3 |

| OLDER SYMBOL HISTORY | STATE NO. | METRIC | EXPECTED COMPLEX VALUES | | | |
|---|---|---|---|---|---|---|
| | | | 00 | 01 | 10 | 11 |
| PAIRS OF SOFT VALUES | 00 | 28.2 | z00 | z01 | z02 | z03 |
| PAIRS OF SOFT VALUES | 01 | 35.6 | jz02 | jz00 | jz03 | jz01 |
| PAIRS OF SOFT VALUES | 10 | 10.3 | -jz01 | -jz03 | -jz00 | -jz02 |
| PAIRS OF SOFT VALUES | 11 | 39.0 | -z03 | -z02 | -z01 | -z00 |

Fig. 6

| OLDER SYMBOL HISTORY | STATE NO. | METRIC | EXPECTED COMPLEX VALUES | | | |
|---|---|---|---|---|---|---|
| | | | 00 | 01 | 11 | 10 |
| PAIRS OF SOFT VALUES | 00 | 28.2 | z00 | z01 | z02 | z03 |
| PAIRS OF SOFT VALUES | 01 | 35.6 | jz03 | jz00 | jz01 | jz02 |
| PAIRS OF SOFT VALUES | 11 | 39.0 | -z02 | -z03 | -z00 | -z01 |
| PAIRS OF SOFT VALUES | 10 | 10.3 | -jz01 | -jz02 | -jz03 | -jz00 |

Fig. 7

| OLDER SYMBOL HISTORY | STATE NO. | METRIC | EXPECTED COMPLEX VALUES | | | |
|---|---|---|---|---|---|---|
| | | | 00 | 01 | 11 | 10 |
| PAIRS OF SOFT VALUES | 00 | 28.2 | z00 | z01 | z02 | z03 |
| PAIRS OF SOFT VALUES | 01 | 35.6 | z03 | z00 | z01 | z02 |
| PAIRS OF SOFT VALUES | 11 | 39.0 | z02 | z03 | z00 | z01 |
| PAIRS OF SOFT VALUES | 10 | 10.3 | z01 | z02 | z03 | z00 |

Fig. 8

ADAPTIVE MAXIMUM LIKELIHOOD DEMODULATOR

FIELD OF THE INVENTION

The present invention relates to the demodulation of digitally modulated radio signals received on a channel which might contain inter-symbol interference, frequency errors, distortion or any combination of these impairments, and in particular, to channels which have impairments that are not constant but rather vary with time.

BACKGROUND OF THE INVENTION

Figure 1:
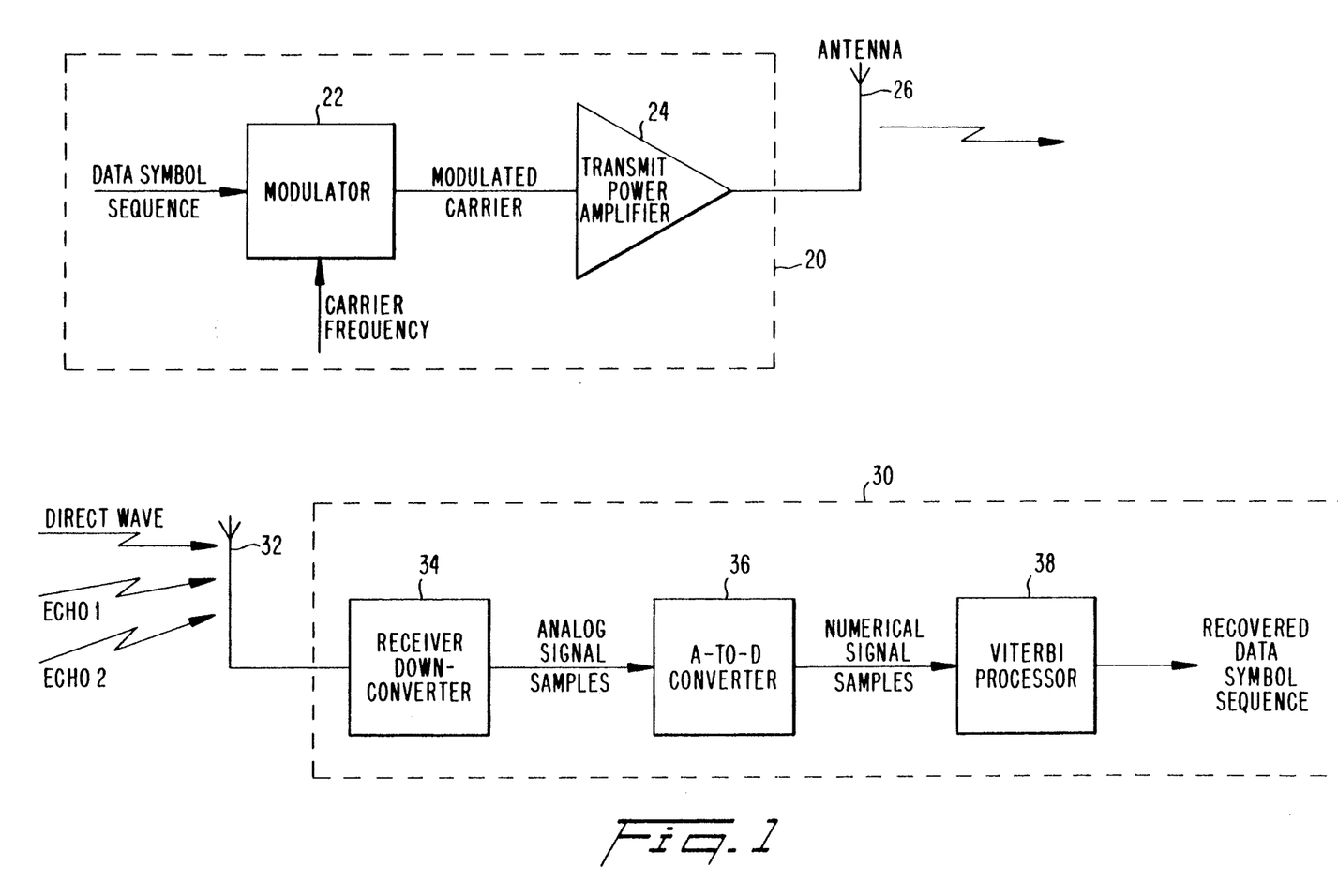
FIG. 1 illustrates a communication system incorporating a Viterbi equalizer.

FIG. 1 illustrates a prior art arrangement of a transmitter, propagation channel and a receiver having a viterbi equalizer for compensation of time delayed echoes of the signal propagated through the channel.

The demodulation of digitally modulated radio signals received through a channel that results in inter-symbol interference may be achieved by the use of a Viterbi algorithm for Sequential Maximum Likelihood Sequence Estimation (SMLSE), also known as the Viterbi equalizer. The Viterbi equalizer, which is well known in the art, uses a linear and finite impulse response model of the channel to predict the signal sample values that should be received from each possible data pattern that can be contained in the channel impulse response time span. The equalizer compares each prediction with the actual received signal sample values, and accumulates "votes" for or against the possibility of each data pattern being the correct data pattern based upon the accuracy of the match between the predicted signal and the actually received signal. However, not all prediction sequences are valid. For example, predicting that the data sequence is 10010 at one instant and 11001 at the next instant are not compatible. The sequence 10010 can only be followed by the sequence 00100 or 00101 when the sequence 10010 is left shifted through the channel and a new 0 (or 1) is added. Likewise, a new sequence 00100 or 00101 can have only a sequence of 10010 or 00010 as a predecessor. As a result, a set of transition rules constrains how "votes" may sequentially be accumulated for each candidate prediction sequence.

The equalizer typically selected implements a linear, finite-impulse-response ("FIR") model of the channel consisting of a transversal filter, i.e., a tapped delay line having complex multiplication weights which are applied to the tap outputs. The weighted outputs are summed to predict, for each possible data symbol pattern that can be contained within the time span of the channel's impulse response, the signal value that should be received for the next data symbol. The predicted values are compared with the actually received signal values, and "votes" for and against the probability of each data symbol pattern being "correct" (i.e., the pattern transmitted) are accumulated. Each "vote" is based on the accuracy of the match between a predicted sequence of values and the received sequence. The data symbol patterns that can be contained within the time span of the channel's impulse response correspond to the "states" of the system.

The weights applied to the delay line tap outputs are the coefficients, $c_1, c_2, c_3, \ldots$, in the equation:

$$S_i = c_1 d_i + c_2 D_{i-1} + c_3 D_{i-2} + \ldots$$

where $S_i$ is the predicted signal for the sequence of data symbols $D_i, D_{i-1}, D_{i-2}, \ldots$ The coefficients are usually calculated from a known training pattern. In the case of signalling by binary data symbols (i.e., 1 and 0), the number of predicted signals that must be calculated is $2^n$, where n is the impulse response length of the channel in symbol periods. It will be understood that ternary and quaternary data symbols can also be used. In these cases, the number of predicted values would be $3^n$ or $4^m$ correspondingly.

The known Viterbi equalizer incorporates the following steps: (1) determining the tap coefficients for a Finite Impulse Response (FIR) model of a channel; (2) for all possible data symbol sequences that can be postulated to be within the impulse response length of the channel model, predicting the signal value that should be received based on the determined tap coefficients; (3) comparing each postulated value with the actually received signal value and calculating the mismatch (usually by squaring the difference between the received and postulated values); (4) for each postulated symbol sequence, adding the calculated mismatch to the cumulative mismatch of predecessor sequences that are consistent with the postulated symbol sequence, also called "the state" (the cumulative mismatch values are called "path metrics"); and (5) choosing the "best" of the possible predecessor sequences that can transition to the new postulated state, i.e., choosing the predecessor sequence which gives the lowest path metric for the new state. Thus, the path metrics can be considered as confidence factors that represent the degrees of correlation between the postulated symbol sequences and the actual received signal.

Figure 2:
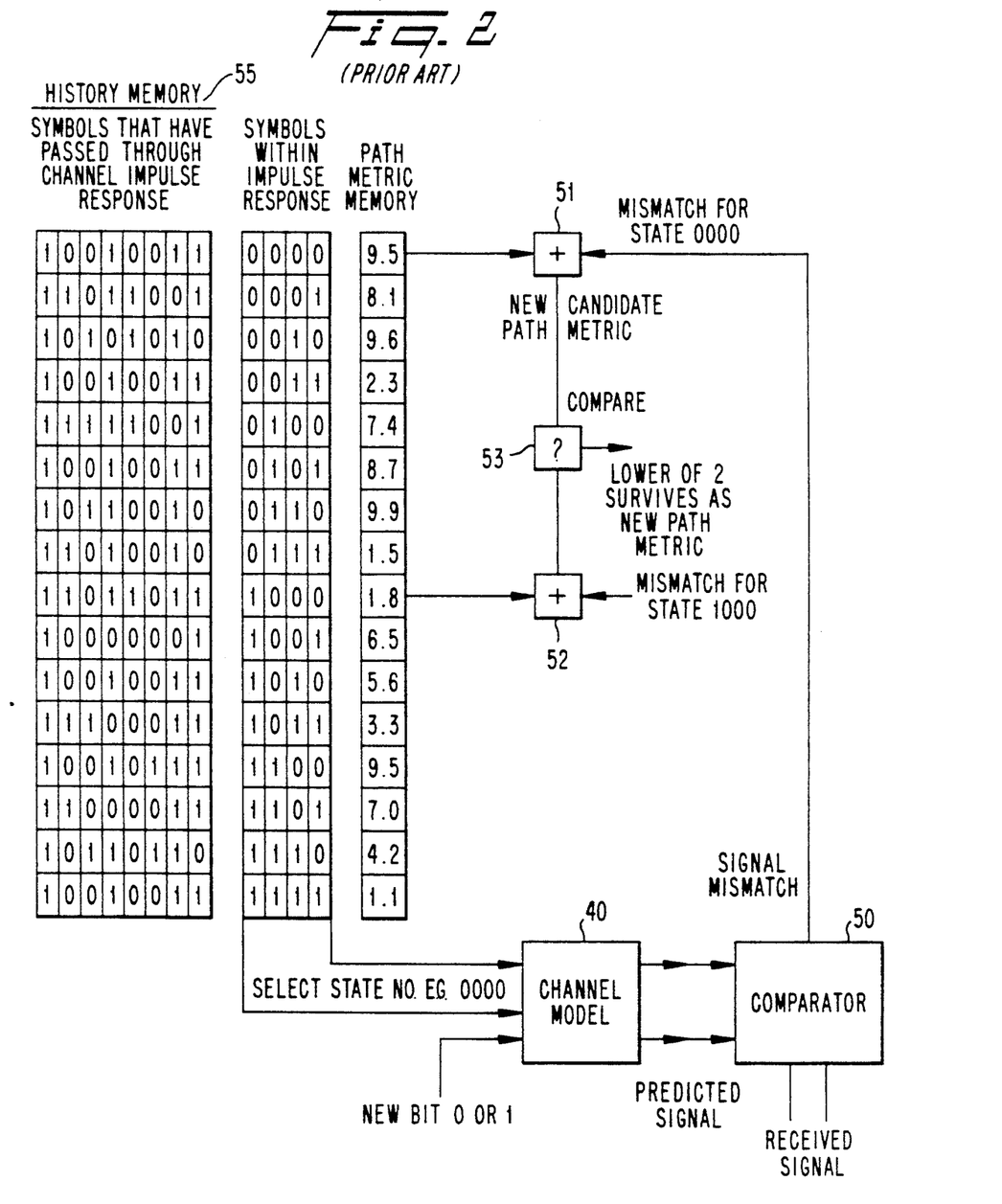
FIG. 2 illustrates the data structure and flow within a prior art Viterbi equalizer.

FIG. 2 illustrates the data structure and flow within a Viterbi equalizer having 16 states, the predicted signal values being assumed to depend on four previous binary symbols (bits) plus one new bit. The channel impulse response length for this example is thus five symbols, i.e. the latest echo can be four symbols delayed compared to the shortest signal path.

Referring to FIG. 2, a Viterbi processing cycle begins by assuming the postulated symbol history of state 0000 to be true, and that a new bit '0' was transmitted. Consequently, using the channel model 40, the signal value that should be observed given the 5-bit symbol history 00000 is predicted. This is compared in comparator 50 with the actual received signal value and a mismatch value produced. The mismatch value is added in adder 51 with the previous cumulative mismatch for the symbol history of state 0000 to produce a new candidate path metric for a new 0000 state.

However, another candidate for the new path metric of new state 0000 can be derived by assuming state 1000 to contain the true history, with a new bit of '0'. This is because both 0000-0 and 1000-0 lead to new state 1-0000 (0-0000) when the oldest (left-most) bit is left shifted out of the 4-bit state number and into the symbol history memory. This candidate is evaluated by applying 10000 to the channel model 40, comparing the prediction so-obtained with the input signal value in comparator 50 and adding the resultant mismatch with the previous cumulative mismatch (path metric) associated with state 1000 in adder 52. The two candidate values from adders 51 and 52 are then compared in a comparator 53, and the lower of the two is selected to become the new path metric of new state 0000. Furthermore, the content of the history memory 55 associated with the selected predecessor state is selected to be the symbol history of the new state 0000. Also, this selected bit history is left-shifted and a 0 or 1 entered in the right-most position according as state 0000 or 1000 gave rise to the selected candidate path metric.

The above procedure is then repeated with the assumption that the new bit is a '1' in order to produce a new state 0001, also with either state 0000 or 1000 as candidate predecessors.

The above procedure is then repeated using every pair of states, which are 8 states apart, to derive all 16 new states, as follows:

0001, 1001 to produce new states 0010 and 0011
0010, 1010 to produce new states 0100 and 0101
0011, 1011 to produce new states 0110 and 0111
0100, 1100 to produce new states 1000 and 1001
0101, 1101 to produce new states 1010 and 1011
0110, 1110 to produce new states 1100 and 1101
0111, 1111 to produce new states 1110 and 1111

At the end of the above processing cycle, one signal sample has been processed and one extra bit has been demodulated and inserted into symbol history memories 55. There is a tendency for the older bits in the history memories to converge to the same value, at which point that bit can be extracted as a final, unambiguous decision and the history memory shortened by 1 bit.

Other methods of truncating history memory growth are known to the art, such as taking the oldest bits from the state having the lowest path metric.

A variation on the implementation of the Viterbi equalizer is to use the channel model in advance to predict the expected signal for all possible symbol sequences, 32 distinct values for the example illustrated in FIG. 2, and to store them in a memory. This can reduce the complexity of the system in terms of the total number of calculations needed, when the channel model and therefore the signal predictions are expected to be constant for a large number of demodulated symbols. On the other hand, if the channel is time varying such that it must be updated constantly, then recalculation of all predictions must be performed for each demodulated symbol with the new channel model, so pre-calculation is not an advantage.

The prior art deals with methods for updating the channel models from the received signal. One prior art method maintains a separate channel model for each Viterbi state. When the best predecessor state is selected to survive, the channel model belonging to the surviving predecessor state is updated and becomes the channel model for the new state. By using this method, the surviving channel models are always derived from the best demodulated data sequences to date.

SUMMARY OF THE INVENTION

The present invention differs from the prior art in that the present invention does not employ channel models to generate the predictions, except perhaps for initial start up. As a result, the present invention does not update the channel model parameters. Instead, the present invention directly updates the signal predictions for each state without going through the intermediate step of first updating a channel model. Moreover, the rapidity with which signal predictions are adapted to changing propagation paths is enhanced by exploiting symmetries in the prediction table.

BRIEF DESCRIPTION OF THE DRAWINGS

The present invention will now be described in more detail with reference to preferred embodiments of the invention, given only by way of example, and illustrated in the accompanying drawings, in which.

DETAILED DESCRIPTION OF THE PREFERRED EMBODIMENTS

While the following description is in the context of cellular communication systems involving portable or mobile radio telephones and/or personal communication networks, it will be understood by those skilled in the art that the present invention may be applied to other communications applications.

Figure 3:
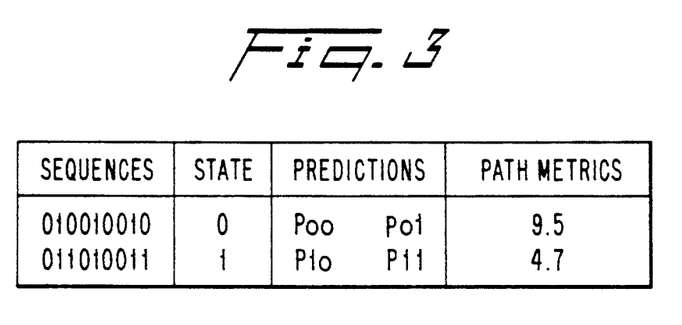
FIG. 3 illustrates an arrangement of values stored in a two-state equalizer according to the present invention.

One embodiment of the present invention uses binary modulation which is illustrated in FIG. 3. In binary modulation, only two predictions are used in connection with each state, a prediction assuming the previous bits of the state plus a new 0, and a prediction assuming the previous bits of the state plus a new 1. A very simple two-state Viterbi equalizer is illustrated in FIG. 3. Referring to FIG. 3, state 0 has an associated prediction Poo corresponding to the assumption that the following symbol is a 0. Likewise, state 1 has a prediction P1o that assumes state 1 is followed by a 0. Both predictions would lead to a new successor state 0. Prediction Poo is compared with a received sample S and a mismatch $$DMoo = (Poo - S)^2$$

is calculated. Likewise, the prediction P1o is compared with the same received sample S and a mismatch $$DM1o = (P1o - S)^2$$

is calculated. If the existing metric in state 0 (9.5) plus DMoo is less than the existing metric for state 1 (4.7) plus DM1o, then state 0 is selected as the predecessor to new state 0. However, if 9.5+DMoo is greater than 4.7+DM1o, then state 1 is selected as the predecessor state to new state 0.

If state 0 is the selected predecessor, then the new prediction Poo that will be lodged with that state will, according to the present invention, be the old prediction Poo updated towards the received signal S according to a formula such as $$\text{new Poo} = \text{old Poo} + A(S - \text{old Poo})$$

where A expresses the fraction of the distance (S-Poo) in which Poo will be adjusted.

On the other hand, if state 1 is selected as the predecessor state to new successor state 0, it would not be logical to use the old Poo, which is from a state which has been rejected as the predecessor state, as the basis for a new Poo prediction. As a result, the present invention utilizes the fact that all likely forms of distortion in the binary communication channel preserve a symmetry property in which Poo=−P11 and Po1=−P1o. Therefore, if state 1 is selected as the predecessor state to new state 0, a new prediction Poo is obtained from the negative of P11. The new prediction Po1 is obtained by updating the old prediction P1o using the assumption that a 1-o signal transition has just been observed, and negating it to give a new value for Po1.

The same procedure is followed for the postulate that the new symbol is a binary 1. If state 1 is selected as the predecessor to new state 1, then the old P11 is updated and becomes the new P11 prediction. On the other hand, if state 0 is selected as the predecessor to new state 1, then the new prediction P11 will be the negative of P00, while the new prediction P1o is obtained by updating Po1 towards the observed value S and then taking the negative value of that number.

In the simple example described above, half of the signal predictions in each state are updated every iteration, so the entire set of prediction values are updated every two iterations. In the prior art method where each state maintains a separate channel model, the whole channel model and thus all signal predictions get updated every iteration. Thus, it might be concluded that the present invention seems to update signal predictions at a slower rate than the prior art method. On the other hand, the prior art method is limited to channel impairments that are included in the channel model, such as inter-symbol interference and frequency error, while the new invention is not limited to certain types of impairments.

The present invention may also be used in situations where a greater number of states are used. In a case such as the one illustrated as FIG. 2, which has sixteen states and requires a total of 32 predictions, the present invention maintains a separate set of 32 predictions for each state. The actual number of distinct values stored in a memory can be halved by applying the symmetry property mentioned above. When a transition from a best predecessor state to a successor state is selected, one of the prediction values of the predecessor state corresponding to the transition to the new state is updated, then the entire set of predictions from the selected predecessor are copied across to the successor state. As a result of the above mentioned symmetry property, two of the prediction values in each state will be updated every iteration so the entire set of prediction values for this example will be updated every sixteen iterations on average. While this is slower than some prior art methods, the present invention can still be advantageous for non-linear channel impairments which are not changing too rapidly.

Figure 4:
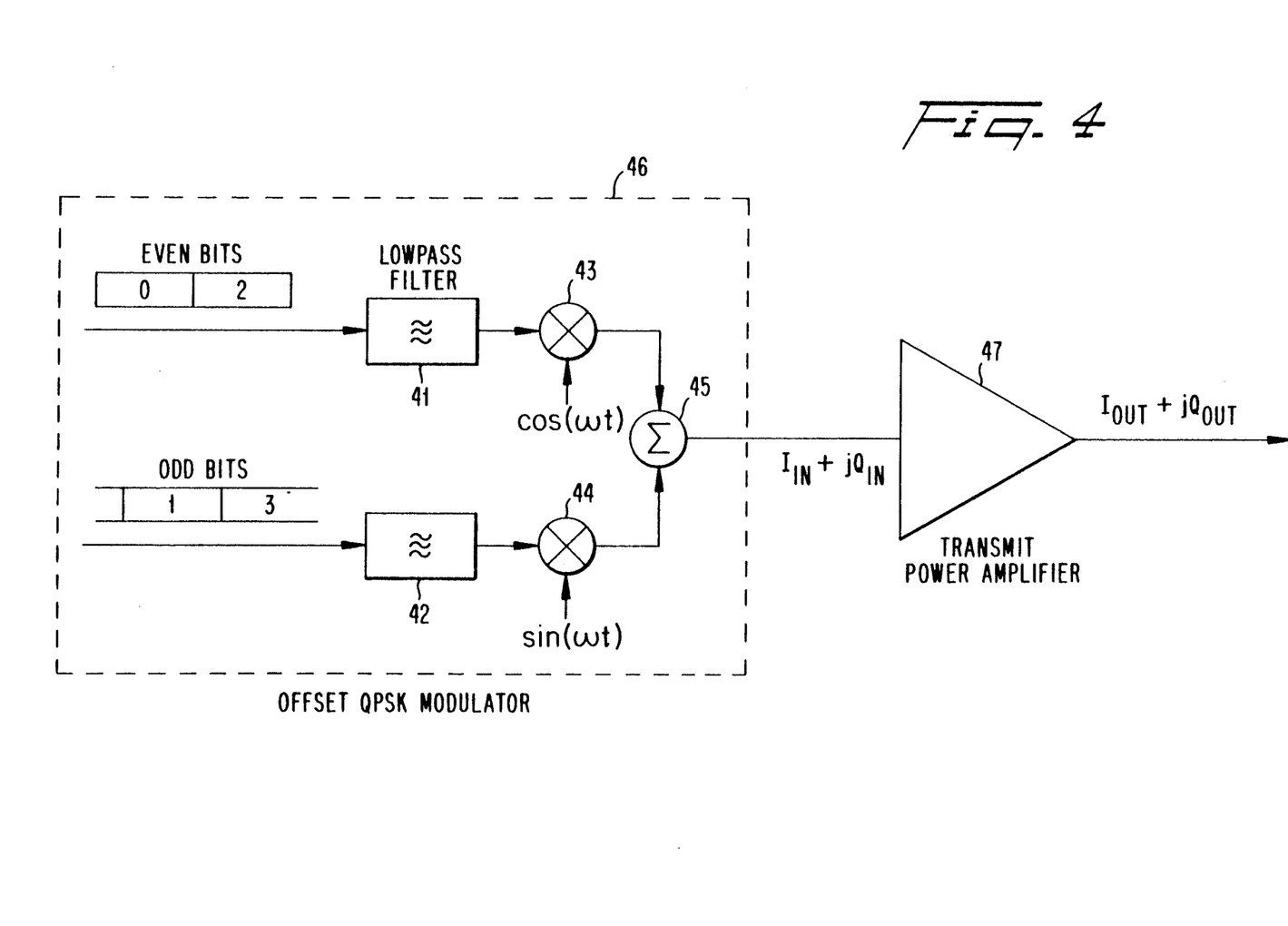
FIG. 4 illustrates a radio transmission system having non-linear impairments.

FIG. 4 illustrates a radio transmission system which may contain non-linear channel impairments. An offset QPSK modulator 46 applies alternate data bits through low pass filters 41 and 42 to quadrature modulators 43 and 44. The output of the quadrature modulators 43 and 44 are then added in summation element 45 such that even bits are modulated onto a cosine wave radio carrier and odd bits are modulated onto a sine wave carrier. The resulting radio signal has a varying phase and a varying amplitude, and its instantaneous value can be represented by a complex vector having an appropriate length and phase angle. Each instantaneous complex value of the vector depends on the number of consecutive data bits, by virtue of the time response of the low pass filters 41 and 42.

The phase and amplitude varying signal denoted by $I_{in}+jQ_{in}$ is applied to a transmitter power amplifier 47. The amplifier should ideally be of the linear class A,B or AB variety so that the signal is not distorted. However, even these types of amplifiers are, in practice, imperfect and two main types of distortion can occur: amplitude distortion and amplitude to phase conversion. In the first type of distortion, the output amplitude is not a linear function of the input amplitude, although there is a 1:1 correspondence between the input amplitudes and the output amplitudes. In the second type of distortion, a phase rotation is introduced which depends on the amplitude of the signal. However, there is still a 1:1 correspondence between the complex values at the output $I_{out}+jQ_{out}$ and the complex values at the input $I_{in}+jQ_{in}$. Therefore, the distortion caused in the non-linear transmitter does not alter the property that there is associated with each data sequence a discrete complex vector $I_{out}+jQ_{out}$, even though it is no longer a linear convolution of the data sequence with a filter impulse response. Thus, the linear channel model of the prior art Viterbi equalizer is insufficient to predict these complex vector values. However, the present invention determines these values directly through a learning process.

In one preferred embodiment, the present invention is configured for use with 4-level modulation such as QPSK, Pi/4-QPSK or 4-MSK. With these modulations, pairs of data bits, which are to be transmitted, are encoded into quaternary symbols having the notational values 0, 1, 2 or 3, which are assigned one of four phase positions 90° apart around a unit circle. The radio signal to be transmitted is then formed by the transition waveforms between these positions from one symbol to the next. Smooth transitions are created by means of a low pass filter in order to restrict the bandwidth of the transmission. If the transition from one point to the next has a trajectory around the unit circle, the signal is a constant envelope signal that can be handled by a non-liner class C transmitter power amplifier without causing any distortion. However, non-constant envelope transitions are preferred from the point of view of spectral containment. In this case, a linear power amplifier is required, which gives rise to types of distortion which the present invention is designed to handle.

Root-raised-cosine low-pass filtered, differential Pi/4-QPSK is a preferred modulation for the present embodiment. In this modulation, the phase values assigned to successive quaternary symbols are progressively rotated through 45° so that the even symbols nominally occupy positions 0, 90, 180, 270, while odd symbols occupy the positions 45, 135, 225 and 315°. Differential encoding leads to the data being represented by the transition through an angle of ±45° or ±135°, rather than by the absolute phase. This is, for practical reasons, to alleviate potential errors caused by phase slips due to noise of a recreated receiver phase reference, and is not material to the operation of the present invention.

Figure 5:
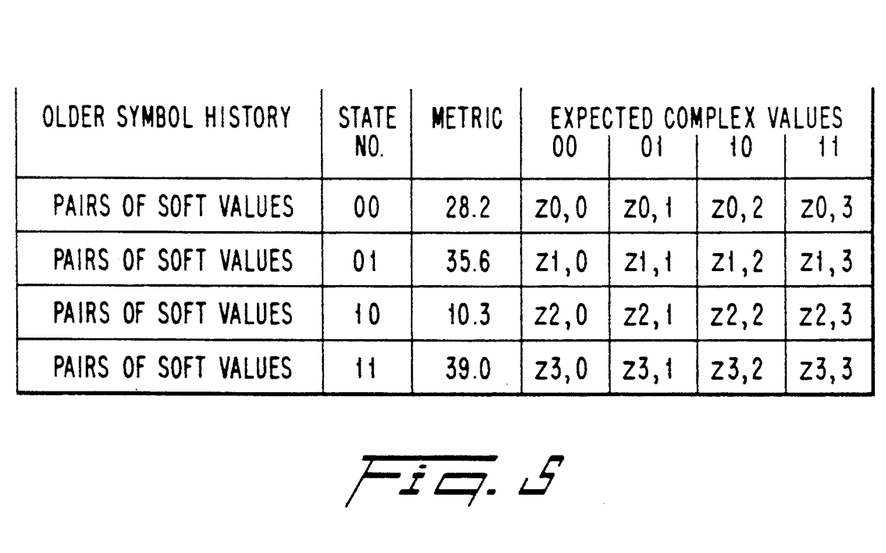
FIG. 5 illustrates a table of values stored in a quaternary equalizer according to the present invention.

The arrangement of values stored in a 4-state demodulator according to the preferred embodiment is illustrated in FIG. 5. In FIG. 5, memory state 10 has the lowest accumulated metric at the current state of operation. If this arose due to propagation from previous state 11, for example, Z3,2 would have been the expected IQ value, and therefore Z3,2 would be updated in the direction of the observed IQ value by:

$$Z3,2 = Z3,2 + (IQ - Z3,2)/16.$$

In this way, all expected values gradually become updated without the use of a channel model. As a result, the present invention has the advantage that the receiver adapts itself to precisely those values that the transmitter actually sends, as modified by the channel, and imperfections such as distortion, echoes and modulation inaccuracy no longer need to degrade system performance. Thus, the requirements for transmitter modulation accuracy can be relaxed, and transmitter or receiver distortions that in an extreme case can be hard limiting are automatically handled. The adaption process can be considered to be slower than updating channel tap estimates every iteration because it takes 16 iterations on average to update all expected values. However, in the preferred embodiment, the present invention takes advantage of the four-fold symmetry which exists in the prediction values in order to accelerate adaptation.

The progressive 45° rotation in Pi/4-QPSK may be removed prior to processing by applying an inverse progressive rotation, so that the expected values of the received vector, in the absence of channel echoes, are reduced once more to only four values which are 90° apart. The four state demodulator according to the present invention, envisions a channel impulse response that can be equated to a one-symbol delayed echo, so that the received vector partially depends on the current symbol being demodulated and partly on the previous symbol, which is a total of 16 possible complex values. In the case of binary symbols, a two-fold symmetry in the prediction tables has already been noted, because the expected I,Q values for complementary bit patterns differ just in sign. In the case of 4-ary QPSK, even with echoes, a four-fold symmetry exists because the expected I,Q values for symbol sequences 00, 11, 22, 33 just differ by a progressive 90° rotation. In addition, the expected values for symbol sequences 01, 12, 23, 30 and for 02, 13, 20, 31 and for 03, 10, 21, 32 also just differ by a progressive 90° rotation. The Pi/4-QPSK gives the same result after taking out the systematic Pi/4 phase advance between each symbol by means of a pre-rotation.

Figure 6:
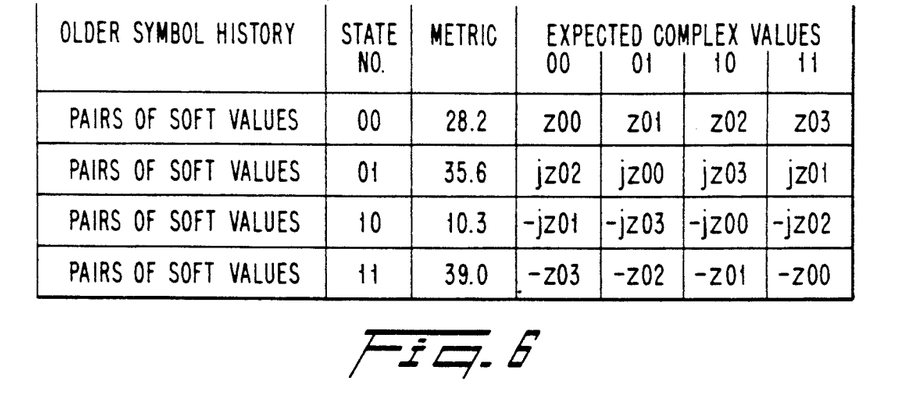
FIG. 6 illustrates a table of values stored in a demodulator according to the present invention.

The four-fold symmetry is illustrated in FIG. 6. In FIG. 6, the prediction table involves only four distinct values, but in a different order for each state and with sign changes or multiplication by $j = \sqrt{-1}$. Although the same four distinct values appear in each state, they may in fact be separate estimates of the four values for each state.

Figure 7:
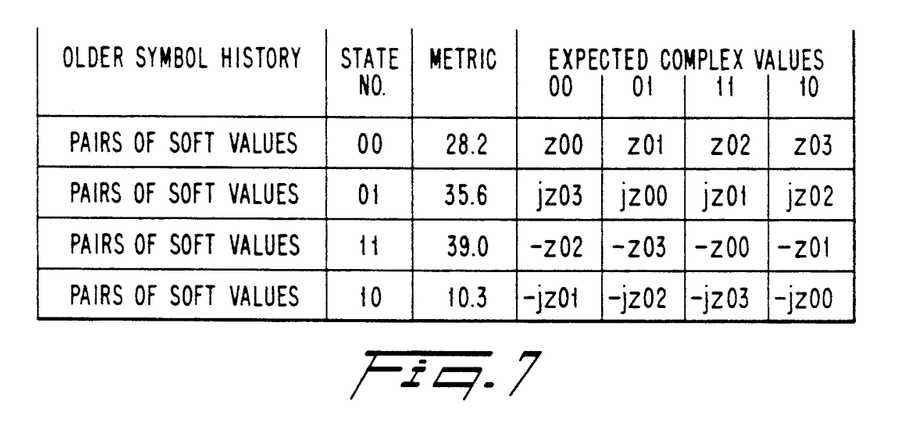
FIG. 7 illustrates a table of values stored in the present invention using gray code symbol ordering.
Figure 8:
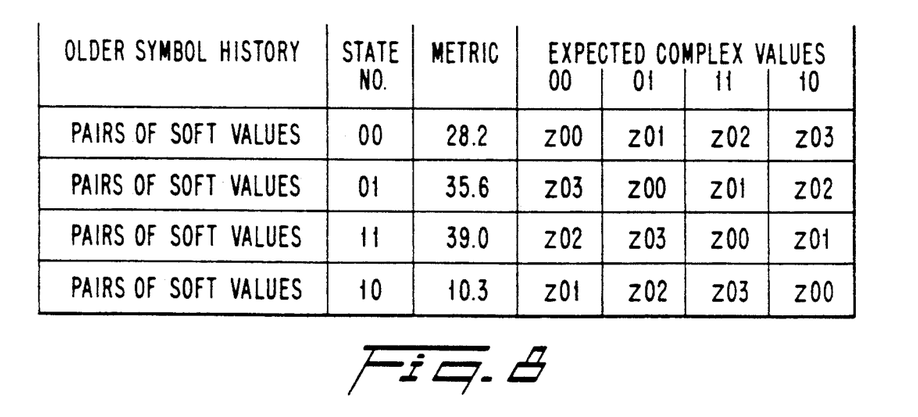
FIG. 8 illustrates an arrangement of stored values after removal of progressive 90° rotation between rows

The order of the four values becomes more recognizable by rearranging the states and symbols in order, as illustrated in FIG. 7. Finally, the progressive 90° rotation between rows, which appears in FIG. 7, may be eliminated by instead rotating the received I,Q values. The table values then appear as illustrated in FIG. 8. In FIG. 8, it should be remembered that the ZOO stored in one row for a state is not necessarily the same as the ZOO value for another state but is rather a separate estimate of the value associated with that state. The predicted Z-values for each state are based on the premise that the symbol history associated with that state is the true symbol history.

Adaptation of the Z-values occurs in the following manner. Each predecessor state 00, 01, 11, 10 is tested in turn with the assumption of a new symbol 00. The predictions ZOO, Z02, Z03, Z01 are then compared with the progressively rotated versions of the received I,Q value. The mismatch between the predicted and the received signal is then squared and added to the existing metric of each state. The state which has the lowest resulting metric becomes the selected predecessor for the new state 00. The predecessor state's associated symbol is then left shifted with the symbol history associated with the state to become the new symbol history for new state 00. The predecessor state Z-value, Zxo (where X is the predecessor state number) is then updated, as previously described, by moving the value a little in the direction of the received I,Q value rotated to either (I,Q), j(I,Q), −(I,Q) or −j(I,Q) depending upon the state X. Then, the group of four Z values are copied from the predecessor state to the new 00 state, with appropriate position shifts as the new predictions for the transition 00→X. The above process is then repeated for the new symbol assumptions of 01, 11 and 10 to generate new states 01, 11 and 10. At the end of the complete iteration, four out of the sixteen predictions values will have been updated. Thus, all 16 prediction values will be updated on the average every four iterations.

The present invention may also be used in situations in which longer channel impulse responses are encountered which have a greater number of states. For example, two-symbol delayed echoes would need 16 states and 64 prediction values. Four-fold symmetry may still be used in this case, so that the 64 prediction values may be reduced to 16 distinct values. To ensure that the 16 predictions associated with the state have been derived from the symbol history associated with that state, each state is required to store separate estimates of the 16 values, which are copied across to a successor state when one of four predecessor states is selected.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for decoding digital data symbols from a modulated signal in a communication system, including the steps of:

initializing the contents of a predetermined number of electrical state memories corresponding to the possible sequences of data symbols that can precede a new symbol being processed with initial predictions of received signal values corresponding to those sequences followed by all possible values of the new data symbol;

initializing a predetermined number of path metrics each corresponding to one of a plurality of electrical states;

initializing a predetermined number of symbol sequence memories each corresponding to one of said electrical states;

comparing received signal values with predicted signal values;

calculating a mismatch between received and predicted values;

adding said mismatches to said path metrics to generate candidate path metrics;

choosing between groups of said candidate path metrics associated with the possible predecessor symbol sequences of the same new symbol sequence;

writing said chosen candidate path metric to a new state memory associated with said new symbol sequence;

copying predecessor symbol sequence associated with said chosen candidate metric to said new state memory associated with said new symbol sequence;

updating signal prediction value used in calculating said chosen candidate path metric towards said received signal value; and copying predicted signal values including said updated value from predecessor state memory associated with said chosen candidate path metric to said new state memory.

2. A method for decoding digital data symbols from a modulated signal communication system, including the steps of:

determining a set of expected signal values corresponding to all possible sequence of a number of consecutive data symbols;

grouping said set of signal values into equivalence classes taking into account symmetries in the possible signal values;

initializing the contents of a predetermined number of electrical state memories corresponding to the possible sequences of data symbols that can precede a new symbol to be processed with initial predictions of possible received signal values including one member from each of said equivalence classes;

initializing a predetermined number of path metrics each corresponding to one of said classes;

initializing said predetermined number of symbol sequence memories each of which corresponds to one of a plurality of electrical states;

comparing received signal values with predicted signal values and calculating mismatches between the received and predicted values;

adding said calculated mismatches to said path metrics to generate candidate path metrics;

choosing between groups of said candidate path metrics associated with possible predecessor symbol sequences to a new symbol sequence;

writing said chosen candidate path metrics to a new state memory associated with said new symbol sequence;

copying predecessor symbol sequence associated with said chosen candidate path metric to said new state memory associated with said new symbol sequence;

updating predicted signal value used in calculating said chosen candidate path metric by adjusting it towards the received signal value; and transforming by use of said equivalent class and copying predicted signal values including said updated value from a predecessor state memory associated with said chosen candidate path metric to said new state memory.

3. An apparatus for decoding digital data symbols from a modulated signal in a communication system comprised of:

means for initializing the contents of a predetermined number of electrical state memories corresponding to the possible sequence of data symbols that can precede a new symbol being processed with initial predictions of received signal values corresponding to those sequences followed by all possible values of the new data symbol;

comparing means for comparing received signal values with predicted signal values;

calculating means for determining a mismatch between received and predicted values;

summation means for adding said mismatches to path metrics to generate candidate path metrics;

selecting means for choosing between groups of said candidate path metrics associated with possible predecessor symbol sequences to a new symbol sequence to select one candidate from each group;

storage means for storing said chosen candidate path metric in a new state memory associated with said new symbol sequence;

memory transfer means for copying predecessor symbol sequence associated with said chosen candidate metric to said new state memory associated with said new symbol sequence;

calculating means for updating predicted signal value used in calculating said chosen candidate path metric towards said received signal value; and memory transfer means for copying predicted signal values including said updated value from predecessor state memory associated with said chosen candidate path metric to said new state memory.

4. An apparatus according to claim 3, wherein a decoded symbol sequence is selected as the symbol sequence history stored in the state having the lowest accumulated path metric at the completion of decoding a signal segment.

5. An apparatus according to claim 3, wherein a decoded symbol is removed from the symbol sequence memory associated with the lowest cumulative path metric.

6. An apparatus according to claim 5, wherein said removed symbol is the oldest symbol is said sequence memory.

7. An apparatus according to claim 3, wherein said received signal values are complex numbers.

8. An apparatus according to claim 3, wherein said predicted signal values are complex numbers.

9. An apparatus according to claim 3, wherein said predicted signal values correspond to sequences of transmitted binary symbols each having only one of two possible signal values.

10. An apparatus according to claim 3, wherein said predicted signal values correspond to sequences of transmitted quaternary symbols each having one of four possible signal values.

11. An apparatus according to claim 3, wherein said received signal is a data modulated radio signal.

12. An apparatus according to claim 3, wherein said initial signal prediction values are obtained by training said apparatus on a known symbol sequence included in said received signal.

13. An apparatus according to claim 12, wherein said training to derive initial signal prediction values involves correlating received signal values with time shifts of a predetermined signal sequence.

14. An apparatus according to claim 3, wherein soft values corresponding to the relative probabilities of symbols of different polarities are stored in the symbol sequence history memory in place of hard decisions.

15. An apparatus according to claim 14, wherein said soft values are calculated as differences between compared candidate path metrics.

16. An apparatus for decoding digital data symbols from a modulated signal in a communication system comprised of:
    means for determining a set of initial signal prediction values corresponding to all possible sequences of a number of consecutive data symbols;
    grouping means for grouping said set of signal values into equivalent classes taking into account symmetries in the possible signal values;
    means for initializing the contents of a predetermined number of electrical state memories corresponding to the possible sequences of data symbols that can precede a new symbol to be processed with initial predictions of the possible received signal values including one member from each of said equivalent classes;
    comparing means for comparing received signal values with predicted signal values;
    calculating means for calculating mismatches between the received and predicted values;
    summation means for adding said calculating mismatches to path metrics to generate candidate path metrics;
    selecting means for selecting between groups of said candidate path metrics associated with possible predecessor symbol sequences to a new symbol sequence;
    storage means for storing said selected candidate path metrics in a new state memory associated with said new symbol sequence;
    copying means for copying predecessor symbol sequence associated with said selected candidate path metrics to said new state memory associated with said new symbol sequence;
    updating means for updating predicted signal value used in calculating said selected candidate path metrics by adjusting it toward the received signal value; and
    transforming means for transforming, by use of said equivalent class, and copying predicted signal values including said updated predicted value from a predecessor state memory associated with said selected candidate path metrics to said new state memory.

17. An apparatus according to claim 16, wherein a decoded symbol sequence is selected as the symbol sequence history stored in the state having the lowest accumulated path metric at the completion of decoding a signal segment.

18. An apparatus according to claim 16, wherein a decoded symbol is removed from the symbol sequence memory associated with the lowest cumulative path metric.

19. An apparatus according to claim 18, wherein said removed symbol is the oldest symbol is said sequence memory.

20. An apparatus according to claim 16, wherein said received signal values are complex numbers.

21. An apparatus according to claim 16, wherein said predicted signal values are complex numbers.

22. An apparatus according to claim 16, wherein said predicted signal values correspond to sequences of transmitted binary symbols each having only one of two possible signal values.

23. An apparatus according to claim 16, wherein said predicted signal values correspond to sequences of transmitted quaternary symbols each having one of four possible signal values.

24. An apparatus according to claim 16, wherein said received signal is a data modulated radio signal.

25. An apparatus according to claim 16, wherein said initial signal prediction values are obtained by training said apparatus on a known symbol sequence included in said received signal.

26. An apparatus according to claim 25, wherein said training to derive initial signal prediction values involves correlating received signal values with time shifts of a predetermined signal sequence.

27. An apparatus according to claim 16, wherein soft values corresponding to the relative probabilities of symbols of different polarities are stored in the symbol sequence history memory in place of hard decisions.

28. An apparatus according to claim 27, wherein said soft values are calculated as differences between compared candidate path metrics.

* * * * *